US011316410B2

(12) United States Patent
Ronning

(10) Patent No.: US 11,316,410 B2
(45) Date of Patent: Apr. 26, 2022

(54) SYSTEM AND METHOD FOR STATOR SLOT ENCAPSULATION USING INJECTED POLYMER

(71) Applicant: AMERICAN AXLE & MANUFACTURING, INC., Detroit, MI (US)

(72) Inventor: Jeffrey J. Ronning, Grosse Pointe Farms, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 17/192,342

(22) Filed: Mar. 4, 2021

(65) Prior Publication Data
US 2021/0194328 A1 Jun. 24, 2021

Related U.S. Application Data

(63) Continuation of application No. 15/378,743, filed on Dec. 14, 2016, now Pat. No. 10,971,975.

(51) Int. Cl.
*H02K 9/22* (2006.01)
*H02K 1/16* (2006.01)
*H02K 3/18* (2006.01)
*C09K 5/14* (2006.01)
*C09D 201/00* (2006.01)

(52) U.S. Cl.
CPC ............. *H02K 9/22* (2013.01); *C09D 201/00* (2013.01); *C09K 5/14* (2013.01); *H02K 1/16* (2013.01); *H02K 3/18* (2013.01)

(58) Field of Classification Search
CPC ..... H02K 9/22; H02K 1/16; H02K 3/18; C09D 201/00; C09K 5/14
See application file for complete search history.

(56) References Cited

U.S. PATENT DOCUMENTS 2,990,487 A 6/1961 Stigler et al.
3,801,843 A 4/1974 Corman et al.
(Continued)

FOREIGN PATENT DOCUMENTS

EP 0478814 A1 4/1992
EP 2873138 A2 5/2015
(Continued)

OTHER PUBLICATIONS

PCT International Search Report dated Mar. 30, 2018 for corresponding PCT application No. PCT/US2017/066158, filed Dec. 13, 2017.

Primary Examiner — Jue Zhang
(74) Attorney, Agent, or Firm — Burris Law, PLLC

(57) ABSTRACT

A method for improving thermal conduction in a stator having electrically conductive windings wound in a plurality of gaps formed between adjacent pairs of a plurality of teeth of the stator. A plurality of interstitial spaces are formed within each of the gaps during winding of the electrically conductive windings around the teeth. A plug is arranged within each one of the gaps to close off slot openings. A thermally conductive filler compound is injected into each gap under sufficient pressure to at least substantially fill the interstitial spaces within each gap and to at least substantially encapsulate the electrically conductive windings. The thermally conductive filler compound is then allowed to set.

21 Claims, 7 Drawing Sheets

(56) References Cited

U.S. PATENT DOCUMENTS

| | | | |
|---|---|---|---|
| 5,806,169 | A | 9/1998 | Trago et al. |
| 5,869,912 | A | 2/1999 | Andrew et al. |
| 6,075,304 | A * | 6/2000 | Nakatsuka ............... H02K 3/38 |
| | | | 310/43 |
| 6,809,442 | B2 * | 10/2004 | Kaneko ................. H02K 5/128 |
| | | | 310/85 |
| 6,946,758 | B2 | 9/2005 | Du et al. |
| 7,019,429 | B1 | 3/2006 | Larsson et al. |
| 7,067,944 | B2 | 6/2006 | Lieu et al. |
| 7,067,952 | B2 | 6/2006 | Neal |
| 7,154,200 | B2 | 12/2006 | Neal |
| 7,683,509 | B2 | 3/2010 | Neal |
| 7,851,966 | B2 | 12/2010 | Rippel |
| 7,928,348 | B2 | 4/2011 | Neal |
| 9,379,590 | B2 * | 6/2016 | Sheth ....................... H02K 3/48 |
| 10,971,975 | B2 * | 4/2021 | Ronning ................. H02K 3/18 |
| 2007/0013259 | A1 * | 1/2007 | Nakamura ............... H02K 1/20 |
| | | | 310/179 |
| 2010/0102648 | A1 | 4/2010 | Tetzlaff et al. |
| 2011/0309695 | A1 | 12/2011 | Huard |
| 2016/0294243 | A1 * | 10/2016 | Duan ......................... E21B 1/00 |
| 2017/0063200 | A1 | 3/2017 | Tremelling |
| 2018/0316237 | A1 | 11/2018 | Muller |

FOREIGN PATENT DOCUMENTS

| | | |
|---|---|---|
| JP | H05236705 A | 9/1993 |
| JP | 2823412 B2 | 11/1998 |
| JP | 2005094846 A | 4/2005 |
| JP | 2005328689 A | 11/2005 |
| JP | 20081932821 A | 8/2008 |
| WO | WO2008145190 A1 | 12/2008 |
| WO | WO2014011783 A1 | 1/2014 |

* cited by examiner

SYSTEM AND METHOD FOR STATOR SLOT ENCAPSULATION USING INJECTED POLYMER

CROSS-REFERENCE TO RELATED APPLICATIONS

This application is a continuation of U.S. patent application Ser. No. 15/378,743 filed Dec. 14, 2016, the disclosure of which is incorporated by reference as if fully set forth in detail herein.

FIELD

The present disclosure relates to electric motors, and more particularly to a system and method for improving the cooling characteristics of a stator of an electric motor by filling in voids created by coil windings between adjacent stator teeth with a material that fully or substantially encapsulates the stator windings, and thus aids in conducting heat out from the coil windings to the stator.

BACKGROUND

This section provides background information related to the present disclosure which is not necessarily prior art.

With present day electric motors, the teeth of a stator are typically wound with electrically conductive wire having an insulation material thereon. The electrically conductive wire is typically wrapped a number of times around each tooth of the stator. Sometimes wire having a round cross-sectional configuration is used and sometimes wire in the form of a ribbon is used. In either event, however, the winding process typically leaves a plurality of voids between adjacent portions of the conductive wire. The voids are undesirable from the standpoint that they inhibit the thermal conduction of heat out from the conductive windings to the stator material. This can lead to an unacceptable heat buildup in the stator.

SUMMARY

This section provides a general summary of the disclosure, and is not a comprehensive disclosure of its full scope or all of its features.

In one aspect the present disclosure relates to a method for improving thermal conduction in a stator. The stator may have electrically conductive windings wound in a plurality of gaps formed between adjacent pairs of a plurality of teeth of the stator. A plurality of interstitial spaces are formed within each of the gaps during winding of the electrically conductive windings around the teeth. The method may include arranging a plug within each one of the gaps to close off openings between adjacent pairs of the teeth. A thermally conductive filler compound may be injected into each gap under sufficient pressure to at least substantially fill the interstitial spaces within each gap. The thermally conductive filler compound may then be allowed to set.

In another aspect the present disclosure relates to a method for improving thermal conduction in a stator. The stator may have electrically conductive windings wound in a plurality of gaps formed between adjacent pairs of a plurality of teeth of the stator. A plurality of interstitial spaces may be formed within each of the gaps during winding of the electrically conductive windings around the stator teeth. The method may include arranging a thermally conductive plug within each one of the gaps to close off openings between adjacent pairs of the stator teeth. The method may further include injecting a flowable, thermally conductive filler compound into each gap, from opposing axial ends of the stator and under sufficient pressure, to at least substantially fill the interstitial spaces within said gap.

In still another aspect the present disclosure relates to a stator comprising a circumferential body portion and a plurality of teeth projecting radially inwardly from the circumferential body portion. Adjacent pairs of the teeth form gaps therebetween. The stator further may include a plurality of thermally conductive plugs, with each one of the thermally conductive plugs being seated in an associated one of the gaps between each said adjacent pair of teeth. The thermally conductive plugs may be seated in a manner that produces a generally smooth, protrusion free circumferential inner surface for the stator. The stator may also include a plurality of electrically conductive windings wrapped around the teeth, and where each gap has a plurality of interstitial spaces formed therein adjacent to ones of the electrically conductive windings and wall portions formed by the teeth. The stator may also include a thermally conductive filler compound which fills the interstitial spaces within each of the gaps to enhance a conduction of heat from the electrically conductive windings to the stator teeth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a plan view of a prior art stator illustrating the circumferentially spaced apart teeth of the stator;

FIG. 2 is a simplified cross sectional end view of portions of two adjacent teeth of the stator of FIG. 1, but with ribbon windings wound in the gap separating the two teeth, and illustrating a cap fitted partially into the gap to seal off the gap, and a circle indicating where a flowable slot filler compound may be injected into the volume defining the gap to fill the interstitial spaces and voids between the windings, and between the windings and the inner wall surface defined by the two adjacent teeth;

Figure 6:
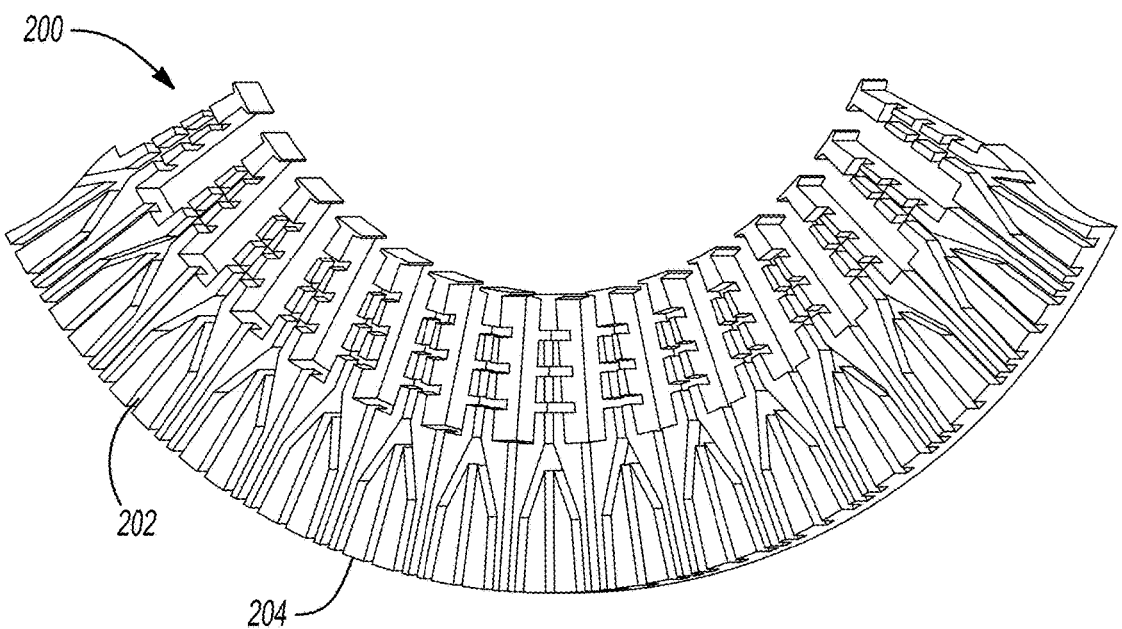
Figure 7:
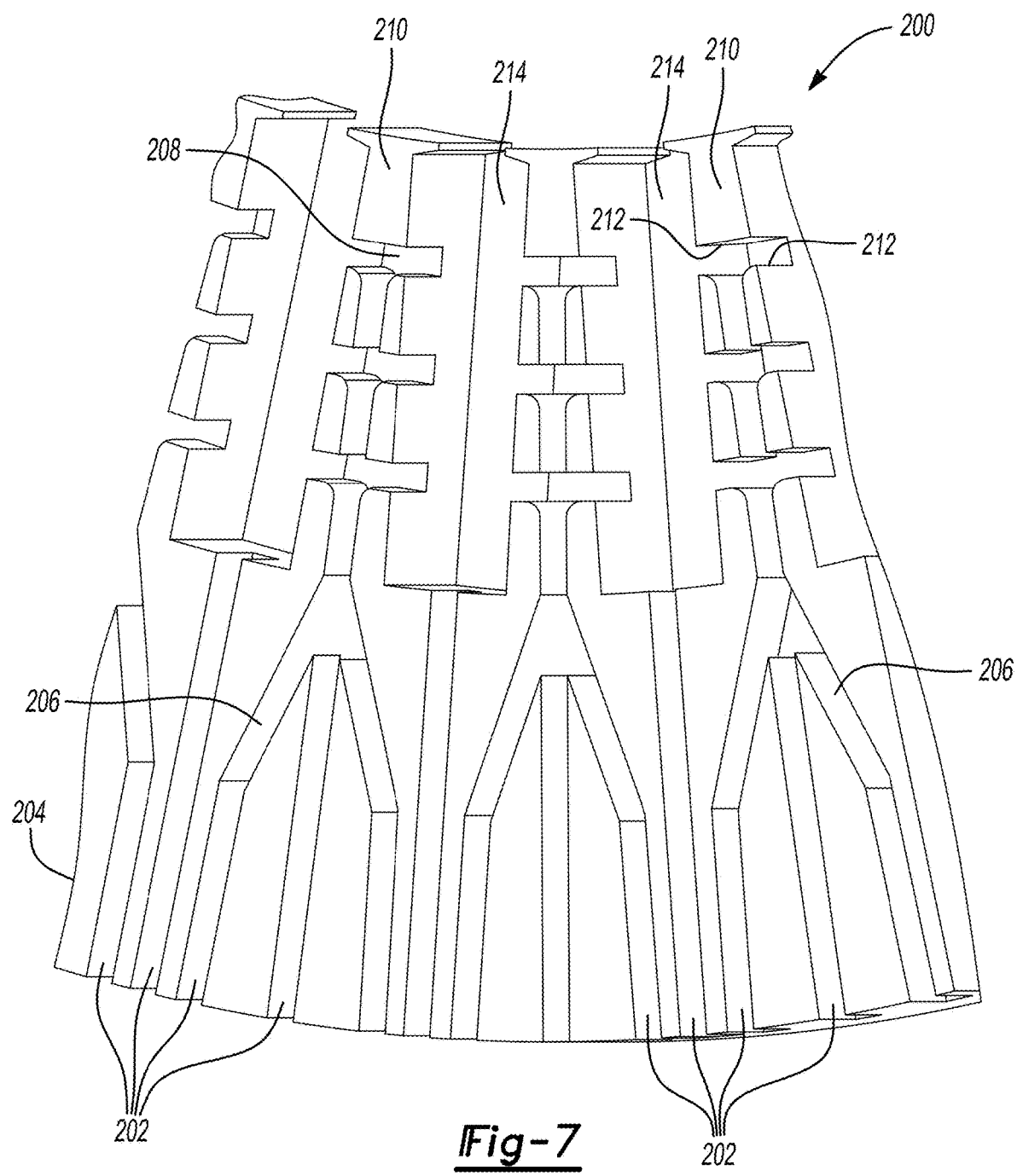
Figure 8:
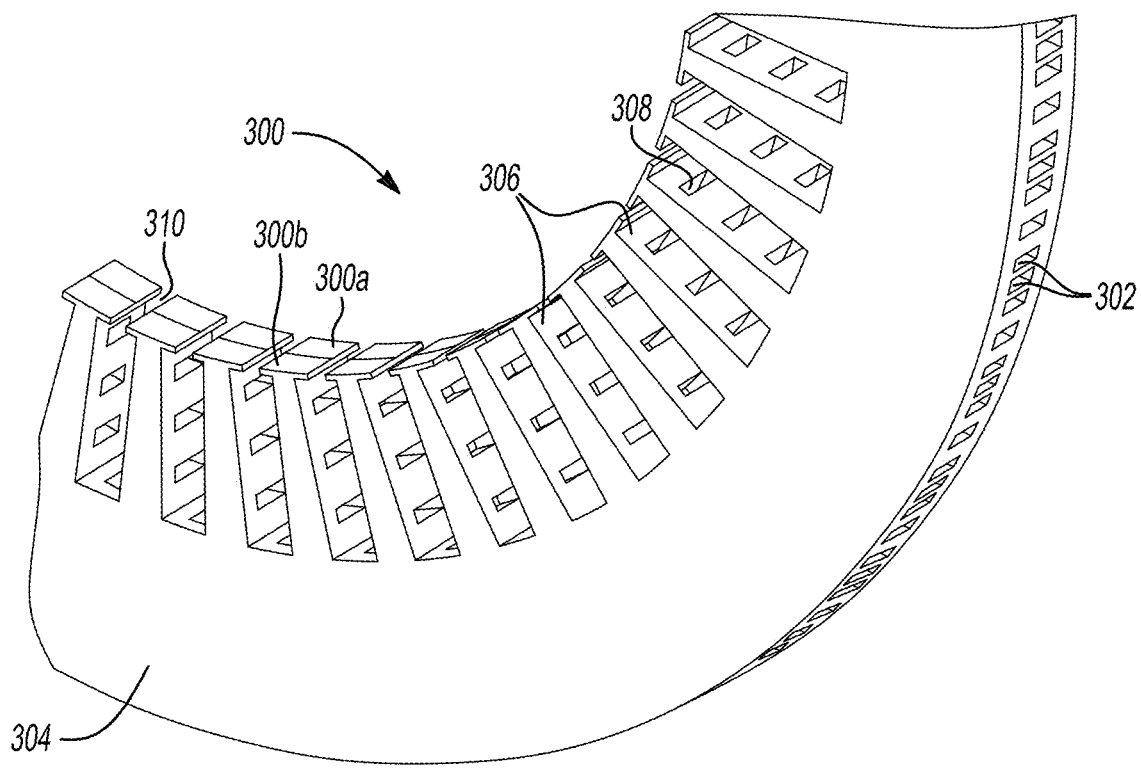
Figure 9:
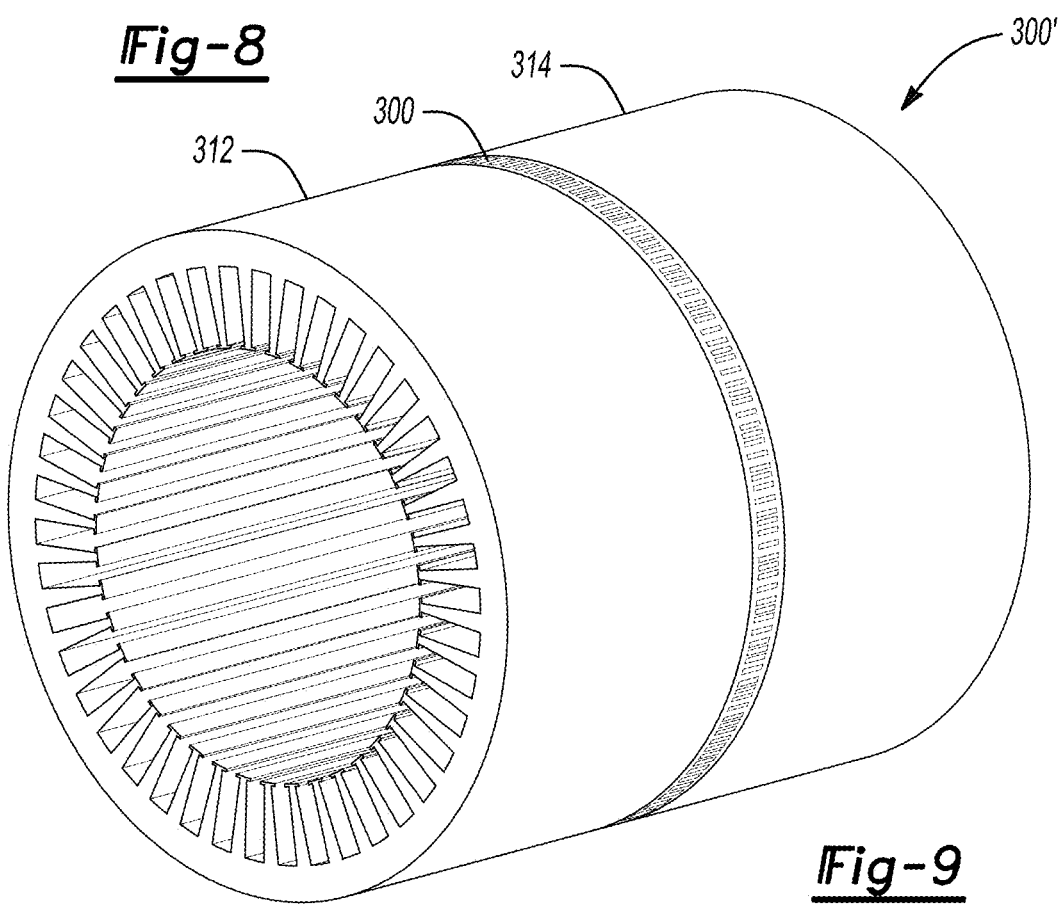
Figure 10:
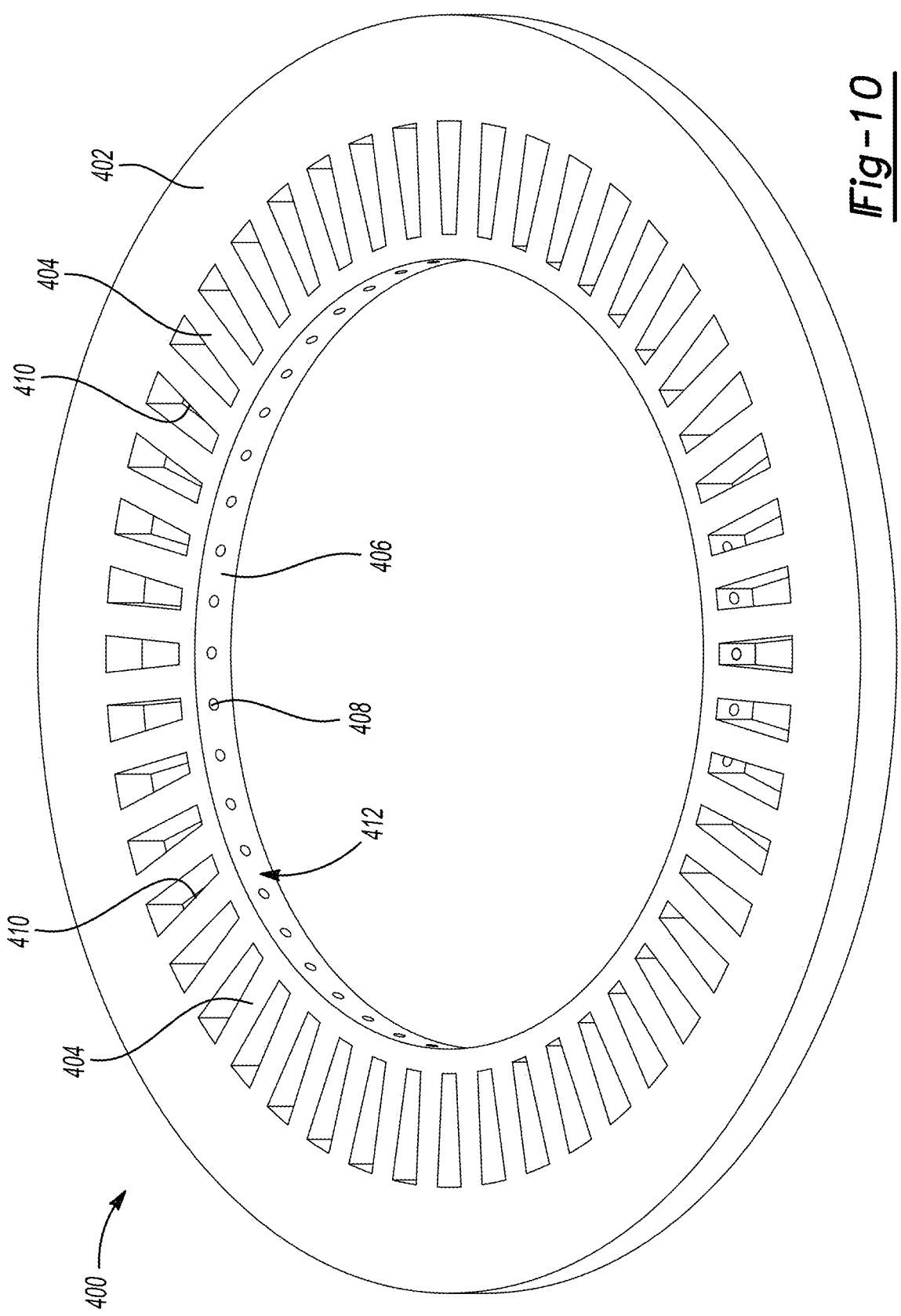

FIG. 6 is a perspective partial cross sectional view of another embodiment of a stator in accordance with the present disclosure in which flow paths are formed in a central, cylindrical body portion of the stator, and where the flow paths extend through each one of the stator teeth, to enable a flowable slot filler compound to be injected through a plurality of ports which open on an exterior surface of the cylindrical body portion at a midpoint of the stator;

FIG. 7 is an enlarged section of the stator of FIG. 6;

FIG. 8 is a perspective, partial cross-sectional view of another embodiment of a stator in accordance with the present disclosure in which a pair of facing manifold plates are used to form a manifold to enable a flowable slot filler compound to be injected through ports formed in an outer surface of a cylindrical body portion and into the gaps adjacent each of the stator teeth;

FIG. 9 is a simplified perspective view of a stator incorporating the manifold of FIG. 8; and FIG. 10 is a perspective view of a manifold in accordance with another embodiment of the present disclosure, in which a circumferential ring is integrally formed with the manifold, and which uses oversized stator slots which provides additional room for the filler compound to flow around and even more optimally fill the interstitial voids.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
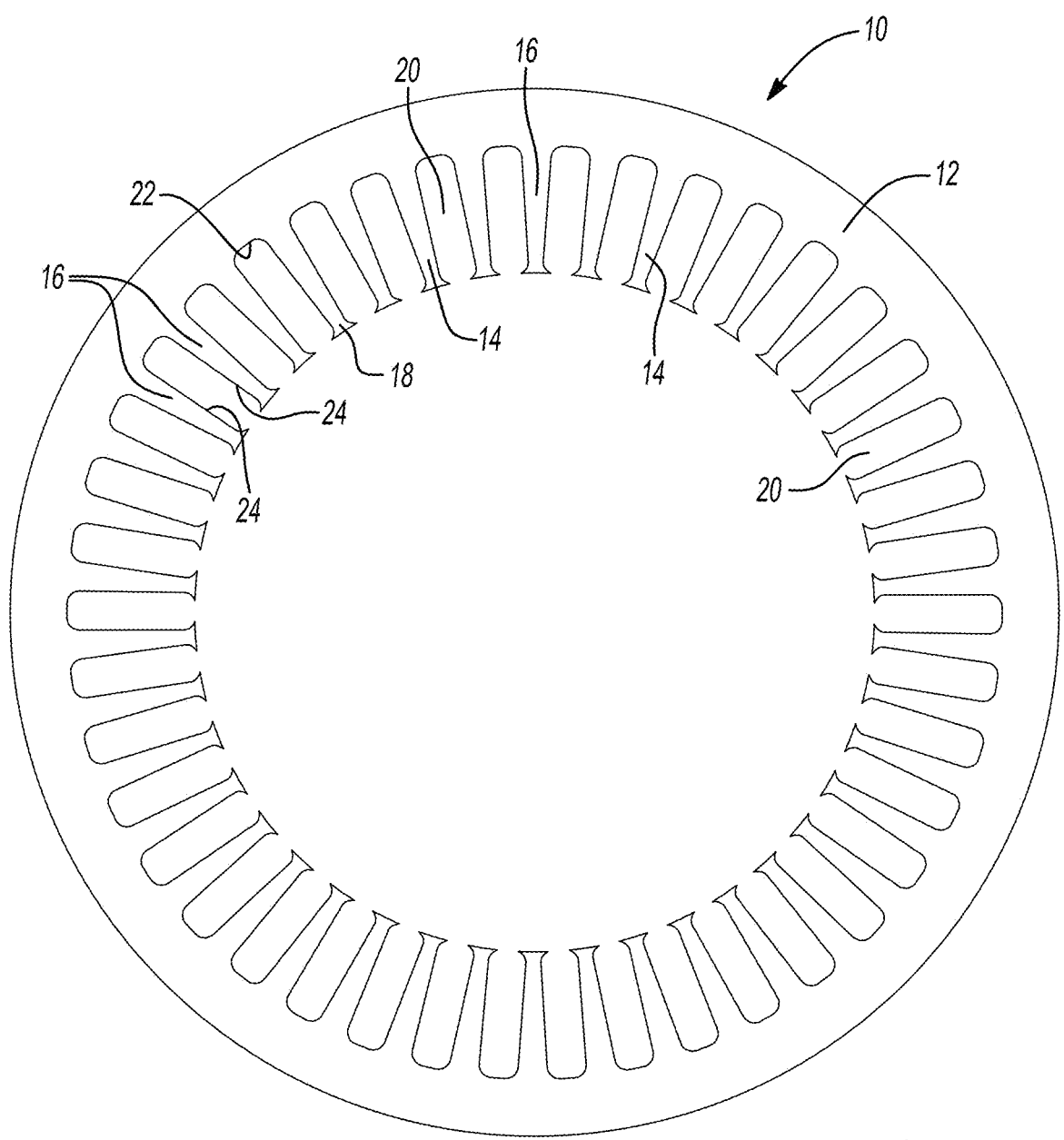

Referring to FIG. 1, a prior art stator 10 is shown. The stator 10 includes a cylindrical body portion 12 from which a plurality of inwardly radially directed teeth 14 project. Each tooth 14 includes a radially inwardly extending wall portion 16 and a head portion 18 which flares out slightly from the wall portion 16, and is larger, cross-sectionally speaking, than the thickness of the wall portion 16. Cooperatively, each two adjacent teeth 14 form an elongated gap 20 therebetween that runs the full axial length of the stator 10. Portions of an inner wall surface 22 of the cylindrical body portion 12 help to define each one of the gaps 20 along with surface portions 24 of each wall portion 16.

Figure 2:
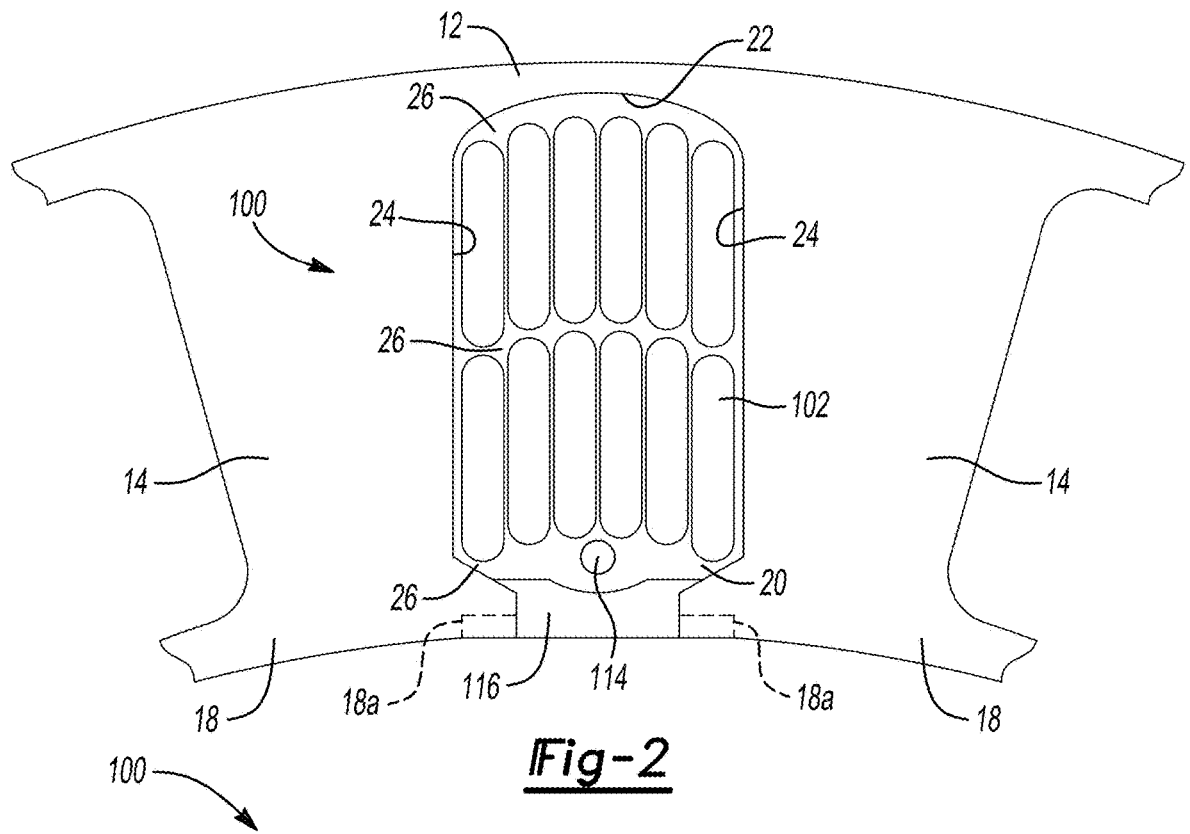
Figure 3:
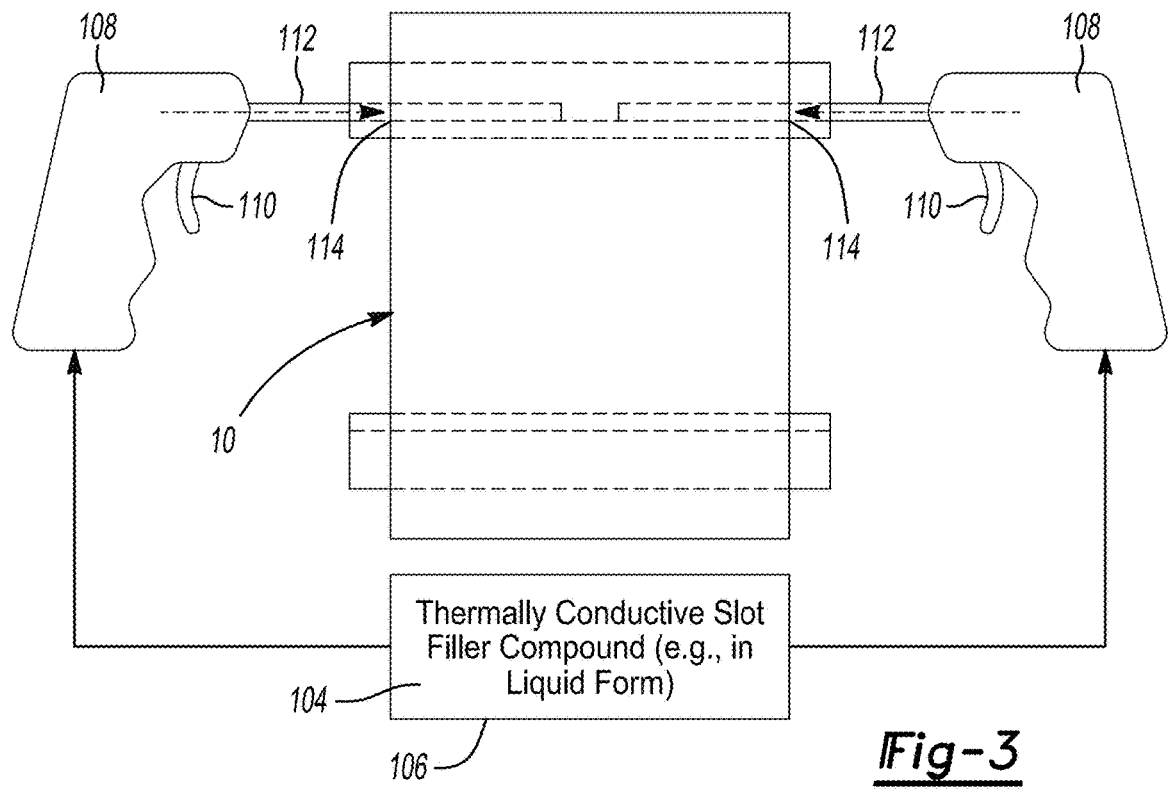
FIG. 3 is a simplified side view showing how the flowable slot filler compound may be injected into each gap simultaneously from opposing axial ends of the stator using suitable injection tools.

Referring to FIGS. 2 and 3, a system 100 is shown for injecting a flowable, thermally conductive slot filler compound into the gap 20 between each adjacent pair of stator teeth 14. By way of example, FIG. 2 shows a plurality of electrically conductive ribbon windings 102 positioned in the gap 20. Alternatively, a plurality of electrically conductive windings having a circular cross sectional configuration could be used; the present system 100 and method is therefore not restricted to use with any one type of winding. However, to minimize voids and interstitial spaces, it is preferred that ribbon windings are used and oriented in the gaps 20 for improved thermal conductivity, such as shown in FIG. 2. Regardless of the type of winding used, the process of wrapping the winding material around the two adjacent teeth 14 results in voids or interstitial spaces 26 formed between portions of the windings and between the windings 102 and the inner surfaces 22 and 24 that form each gap 20. The interstitial spaces 26 inhibit the thermal transfer of heat from the windings 102 to the stator teeth 14 and therefore can contribute to difficulty in maintaining the stator 10 at an acceptable temperature during operation of a motor in which the stator is used. Prolonged unacceptably high winding temperatures can eventually lead to deterioration of the insulating material on the windings 102 and eventually failure of a motor in which the stator 10 is being used.

Referring to FIG. 3, the system 100 addresses the above described problem of the interstitial spaces 26 by injecting a thermally conductive, flowable filler compound 104 into the gap 20 between each adjacent pair of stator teeth 14 to fully, or substantially fully, encapsulate the windings 102. The filler compound 104 also fills the interstitial spaces within each gap 20 and helps to conduct heat from the windings 102 to the stator teeth 14 where the heat can be more effectively dissipated (i.e., either passively or actively through external stator cooling components).

The filler compound 104 may be a polymer material having excellent thermal conductance characteristics, which is maintained in a reservoir 106 in a readily flowable state. Common materials used for encapsulation have thermal conductivity typically on the order of 10 times the value of normal polymers and they maintain high dielectric strength properties. Most commonly, these materials are two-part resins that begin to cure after several minutes of being mixed together. For example, the filler compound 104 may be maintained in a liquid or gel-like state such that it may be pumped out using an external pumping mechanism (not shown) associated with injection guns 108. Each of the injecting guns 108 may have a trigger 110 that, when squeezed, opens internal valving to permit the filler compound 104 to be pumped from the reservoir 106, through nozzles 112, into the gap 20. In this regard it will be appreciated that the injecting guns 108 in this example are positioned at opposite axial ends of the stator 10. With brief reference to FIG. 2, the nozzles 112 inject the filler compound 104 at a location 114 near the radially inward most area of the gap 20. To prevent the filler compound 104 from spilling out from the gap 20 into an interior area of the stator 10, a plug 116 may be inserted to plug an open end of the gap 20. The plug 116 may be made from any suitable thermally conductive material, for example a polymer similar in characteristics to the filler compound 104, or even identical to the filler compound 104. In either event, the specific material selected for the plug 116 should have excellent thermal conductance characteristics.

In one implementation the plug 116 may be made from a polymer that has a small degree of resiliency or deformability, and may have dimensions that enable it to be press fit into the gap 20 between the two adjacent head portions 18 of two adjacent teeth 14 in a friction fit type manner. This would enable the plug 116 to be secured in place without the need for adhesives or like forms of attachment. Alternatively, each head portion 18 of each tooth 14 could include small notched sections 18a, as shown in FIG. 2, and the plug 116 could be formed with projecting sections that engage the notches 18a to positively secure the plug in place. In either event, once all the plugs 116 are installed to fill all the gaps 20, the head portions 118 and the plugs 116 cooperatively form a smooth, generally continuous circumferential surface, as indicated in part in FIG. 2, that is free from protrusions that could otherwise affect fitting (or rotation) of a rotor within the stator 10.

Alternatively, the plug 116 may be formed from a thermally conductive material which is not resilient or deformable. In that case the plug 116 may slidably inserted from one axial end or the other of the stator 10 to close off the gap 20. In this regard it may also be helpful to provide the head portions 18 with notches 18a, and to form the plug 116 with a cross sectional configuration that enables it to be held in place as it is slid fully onto the pair of adjacent teeth 14 of the stator 10.

The filler compound 104 may be injected simultaneously from the injecting guns 108 to fill the gap 20. Alternatively, the filler compound 104 may be injected at one axial end of the stator 110 first and then at the opposite axial end, or the filler compound may even be injected in an alternating fashion from one of the injecting guns 108 and then the other. It is expected that simultaneously injecting the filler compound 104 from the axial ends of the stator 110 will be particularly preferred.

Figure 4:
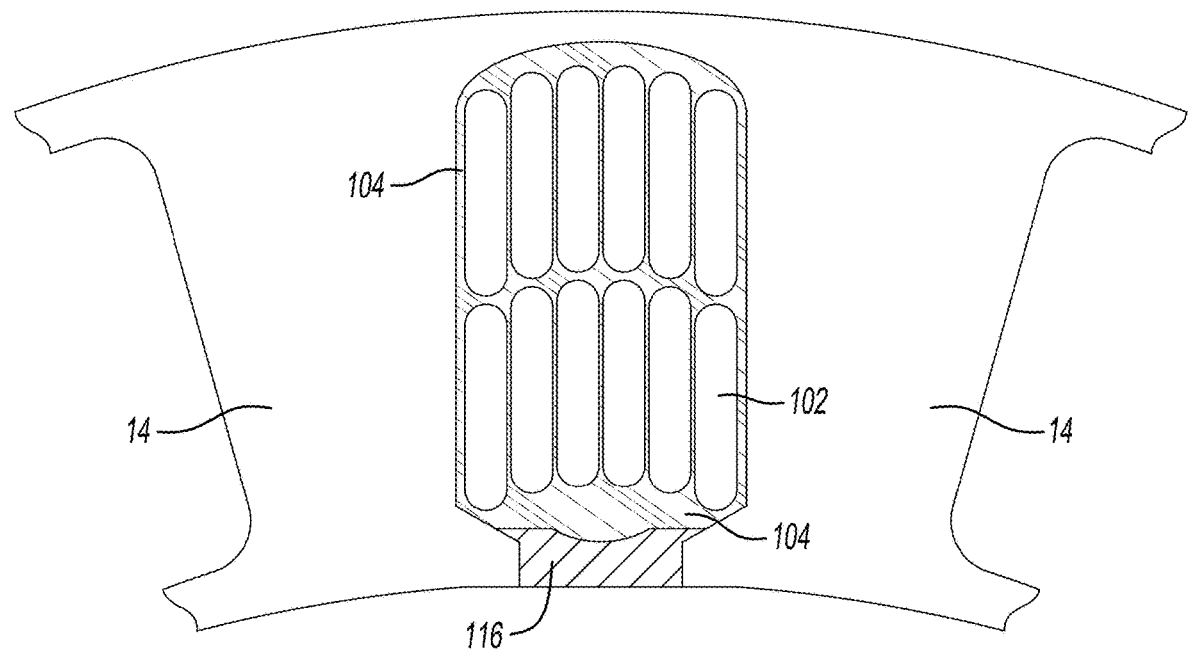
FIG. 4 shows an enlarged cross section of one pair of stator teeth illustrating how the interstitial spaces have been filed with the thermally conductive filler compound after the injecting process is complete.

A suitable amount of pressure is provided to enable the filler compound 104 to be forced by the injecting guns 108 into the various interstitial spaces 26 inside the gap 20 so as to fully, or substantially fully, fill all the interstitial spaces and fully, or at least substantially fully (e.g., 90% or better) encapsulate the windings 102. FIG. 4 illustrates a portion of the stator 10 with the gap 20 having been filled with the filler compound 104. The filler compound 104 helps significantly to conduct heat from the windings 102 out to the stator teeth 14, and therefore to help maintain the windings 102 at an acceptable temperature during operation of the motor in which the stator 10 is being used.

In implementing a method in accordance with the present disclosure the stator 10 may be placed in any suitable fixture. The plug 116 may then be inserted into one of the gaps 20. Alternatively, separate ones of the plugs 116 could be inserted into each of the gaps 20 such that all of the gaps 20 are closed off before starting to inject the filler compound 104. If all of the gaps 20 are closed off with separate ones of the plugs 116, then the injecting guns may be positioned (i.e., either robotically or manually) in position to inject the filler compound into a first one of the gaps 20. The filler compound 104 may be maintained in the reservoir 106 in a heated state that makes the filler compound flowable, such as in a liquid or gel-like condition, so that it may be readily pumped to the injecting guns 108 from the reservoir 106. The injecting guns 108 may be used to inject the flowable filler compound 104 into the gaps 20 one at a time, simultaneously, from opposite axial ends of the stator 10, which at least substantially fills the interstitial spaces within each gap 20 and fully, or at least substantially fully, encapsulates the windings 102. When filling of one of the gaps 20 is completed, the injecting guns 108 may be repositioned, or alternatively the stator 10 rotated a predetermined amount, such that the nozzles 112 are positioned in the next adjacent gap 20, and the above described process repeated. In this regard it will also be appreciated that a suitable mechanism for indexing the injecting guns 108 may be helpful so that the nozzles 112 can be withdrawn, that is, moved axially a small distance away from the ends of the stator 10 after each injection operation is completed, and then moved axially toward one another into the locations 114 on the stator 10 before beginning a new injection cycle.

This process described above for filling each gap 20 is repeated until all of the gaps are filled with the filler compound 104. Alternatively, a sufficient number of injecting guns 108 could be provided so that all of the gaps 20 are filled simultaneously from both axial ends of the stator 10. While this would require a significant additional number of injecting guns 108, actually two injecting guns for each gap 20 of the stator 10, this configuration would significantly reduce the time required to fill all the gaps 20 during a manufacturing process.

Figure 5:
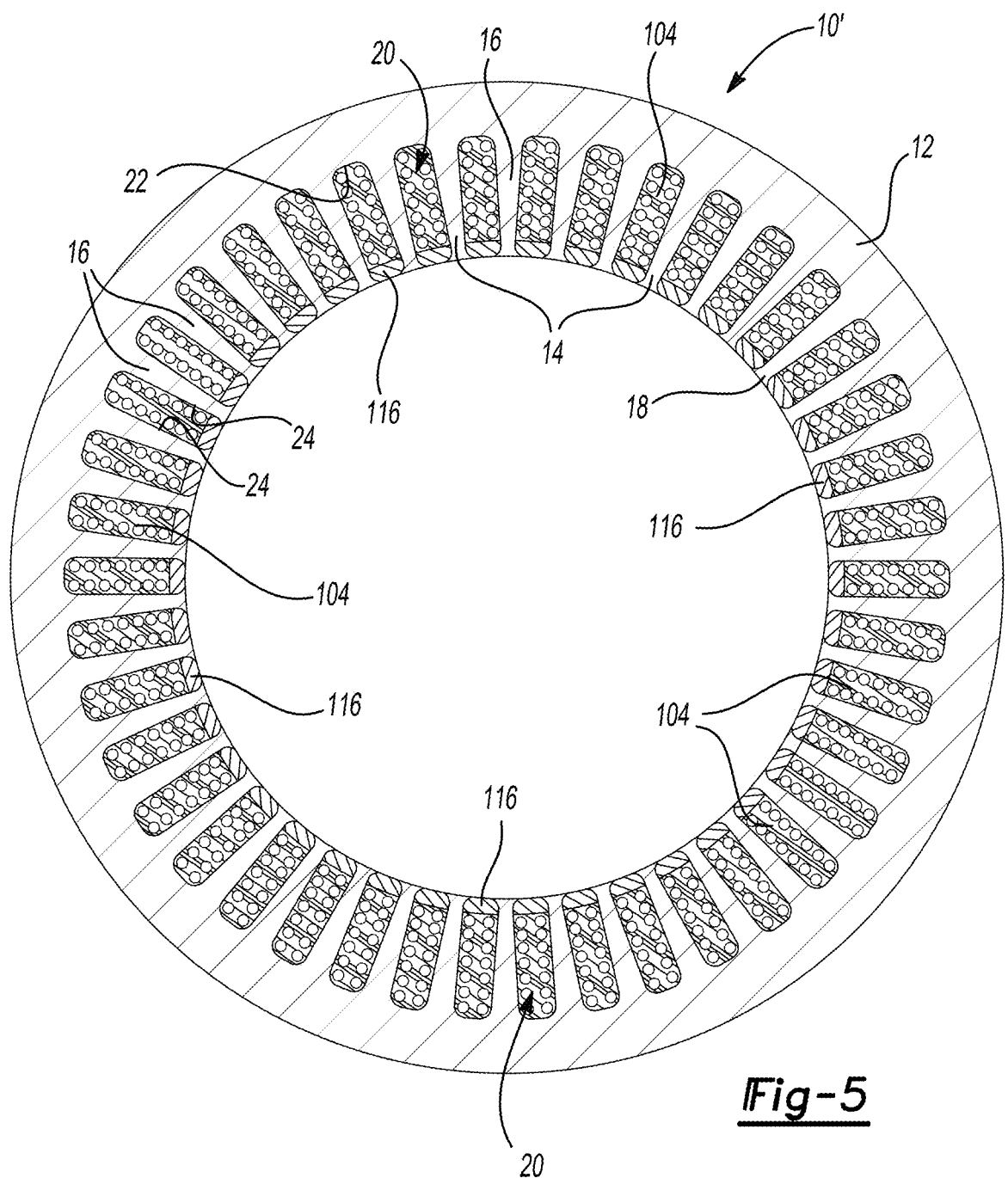
FIG. 5 illustrates a cross-sectional end view of the stator of FIG. 1 after all of the gaps between adjacent pairs of teeth have been filled with the thermally conductive filler compound.

FIG. 5 illustrates a stator 10' formed in accordance with the above-described method. The filler compound 104 fills all the interstitial spaces within each of the gaps 20.

FIGS. 6 and 7 illustrate a portion of a single annular manifold plate 200 that may be used to help construct a stator. The manifold plate 200 may be placed at any point between the last axially placed manifold plates at the opposing ends of the stator, but in one embodiment is placed at an approximate axial midpoint of the stator when the individual plates of the stator are being assembled to form the finished stator. As such, there will be at least one additional plate on each side of the manifold plate 200, but more typically there may be a larger plurality of plates on each side of the manifold plate 200 sufficient to form a stator having the desired axial length.

Referring to FIG. 7, the manifold plate 200 includes ports 202 which are formed to open onto an exterior surface of a cylindrical body portion 204 of the manifold plate. The ports 202 are in communication with flow channels 206 that lead into hollowed out sections 208 of each tooth 210 of the manifold plate 200. Each tooth 210 has notches 212 formed at one, or more preferably a plurality, of locations along its radial length. The ports 202, flow channels 206, hollowed out sections 208 and notches 212 allow a flowable gap filler compound, for example a flowable, thermally conductive polymer, to be injected into the ports 202 and forced into, and out through, the notches 212 into gaps 214 on opposing sides of each tooth 210. The flowable filler compound can be forced through the full axial length of the gaps 214 after all of the stator plates have been assembled together with the stator windings in place. It will be appreciated that with the manifold plate 200, plugs such as 116 may also be used to close off all the gaps 214.

FIGS. 9 and 10 show another embodiment of an annular manifold plate 300 which is formed from two mirror image portions 300a and 300b. The mirror image portions 300a and 300b each include flow channel portions 302a and 302b that, when the two portions 300a and 300b are assembled together, form flow passages 302 in a cylindrical body portion 304. Each tooth 306 of the manifold plate 300 is hollowed out to form an internal hollow area which is in communication with one of the flow passages 302. Each tooth 306 further includes at least one opening 308, and more preferably a plurality of radially spaced apart openings 308, formed on opposing sides, with the openings 308 being in communication with the hollowed out portion of each tooth. As such, a complete flow path is formed from flow passages 302, out through each tooth 306 and into the gaps 310 separating each adjacent pair of teeth 306.

FIG. 9 illustrates the manifold plate 300 being used with stator sections 312 and 314 to form a complete stator 300'. The manifold plate 300 in this example is placed at an approximate axial midpoint of the stator 300', but it may be placed at any axial location so long that its axially opposing surfaces are covered by a separate stator plate or stator section. A flowable filler compound, for example a thermally conductive polymer, may then be injected into the flow passages 302 and into an interior area of each tooth 306. The flowable filler compound will flow out through the openings 308 and be forced into the gaps 310 and around the windings 102 (not shown in FIG. 9) along the full axial length of the stator 300'. The stator sections 312, 300 and 314 may be secured together via any suitable means, for example a suitable adhesive. Again, plugs such as plugs 116 may be used to close off the gaps 310.

FIG. 10 illustrates an annular manifold plate 400 in accordance with another embodiment of the present disclosure. The manifold plate 400 may be assembled between at least a pair of stator sections, for example stator sections 312 and 314 of FIG. 9. The manifold plate 400 includes an outer peripheral body portion 402, a plurality of radially inwardly extending teeth 404 and an inner circumferential ring-like portion 406 having a plurality of radially extending ports 408. The ports 408 are circumferentially aligned with gaps 410 formed between adjacent pairs of the teeth 404. The ports 408 enable the filler compound 104 to be injected from the inner diameter of the manifold 400 rather than from its outer diameter, which may be preferable in certain manufacturing operations. The manifold plate 400 also provides the gaps 410 in slightly oversized form to help promote the flow of the thermally conductive filler compound 104 into and throughout the volumes formed by each of the gaps, which may help to even more fully fill the interstitial spaces within the gaps and even more fully encapsulate the windings 102 (not shown in FIG. 10). The peripheral body portion 402, the teeth 404 and the ring-like portion 406 may be integrally formed as a single piece component, or alternatively in a different embodiment they be formed as two or more independent components and secured together by any suitable fastening technique (e.g., mechanical fasteners, welding, adhesives, etc.). The manifold 400 may be constructed from a high temperature rated plastic, or alternatively any other material having low electrical conductivity and a strength suitable for use as an integral portion of a motor stator assembly. With the manifold plate 400 it will be appreciated that separate plugs, such as plugs 116, will need to be used on opposing sides of the manifold plate 400 to fill the gaps in the plates used to form the remainder of the manifold.

A specific benefit of the manifold plate 400 is that the ports 408, being on the inner diameter of the manifold plate 400, can be fed with a filler compound 104 from a single reservoir. For example, the reservoir may form a cylindrical reservoir or "feeder" that seals to the inner diameter wall of the manifold 400 plate, that is, to an inner surface 412 of the ring-like portion 406, and which overlaps slightly the areas around one or more of the ports 408. Injection of the filler compound 104 may be performed in one gap 410 at a time, with the stator (or reservoir) being rotated as needed to present the next gap for filling. Alternatively the reservoir may be constructed so that the filler compound 104 may be injected into two or more gaps 410 simultaneously, and then the reservoir (or alternatively the stator) may be indexed rotationally to fill two or more different ones of the gaps. Optionally, the reservoir could be constructed so that all of the gaps 410 are filled simultaneously with the filler compound 104 in one manufacturing operation.

The various systems and methods of the present disclosure thus enable the interstitial spaces within each of the gaps between pairs of adjacent stator teeth to be filled in with a thermally conductive filler compound 104, which helps significantly to improve the thermal conductance of heat out from the windings on the stator teeth. The methods disclosed herein may achieve 100% filling of the interstitial spaces at the center of the stator, and greater than 90% filling at the outmost axial ends of the stator. The systems and methods of the present disclosure do not add appreciably to the overall cost of constructing the stator 10, nor do they require significant alterations in the manner of manufacturing a stator.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method comprising:
    providing a stator core with an interior circumferential surface and defining a plurality of winding slots, each of the winding slots extending longitudinally through the stator core as well as radially so as to intersect the interior surface, the winding slots being spaced circumferentially apart from one another so as to form a plurality of teeth, each of the teeth being disposed between an adjacent pair of the winding slots;
    installing a plurality of windings to the stator core, each of the windings being formed of wire, each of the windings being received in a predetermined set of the winding slots;
    installing a plurality of plugs to the stator core, each of the plugs being received between an associated adjacent pair of the teeth and closing a radially inward end of an associated one of the winding slots;
    injecting a filler into each of the winding slots, the filler being more thermally conductive than air over a predefined temperature range; and
    curing the filler in the stator core.

2. The method of claim 1, wherein each of the plugs is press-fit to the associated adjacent pair of the teeth.

3. The method of claim 1, wherein installing a plurality of plugs to the stator core comprises inserting each one of the plugs through an axial end of the stator core into a corresponding one of the winding slots and urging the plugs outwardly to seat the plugs between the adjacent pairs of teeth.

4. The method of claim 1, wherein injecting the filler into each of the winding slots comprises inserting a nozzle into each of the winding slots and dispensing the filler from the nozzle.

5. The method of claim 1, wherein the stator core comprises a pair of core segments and wherein the stator core further comprises an annular manifold plate that is disposed between the stator core segments, each of the core segments defining a portion of each of the winding slots, wherein the annular manifold plate defines a plurality of circumferentially spaced apart manifold slots, each of the manifold slots forming a portion of a corresponding one of the winding slots, and wherein injecting the filler into each of the winding slots comprises injecting the filler radially into each of the manifold slots in the annular manifold plate.

6. The method of claim 5, wherein the annular manifold plate defines a plurality of circumferentially spaced apart ports, each of the ports extending radially outwardly from an interior surface of the annular manifold plate and intersecting an associated one of the manifold slots.

7. The method of claim 5, wherein the annular manifold plate defines a plurality of circumferentially spaced apart ports, each of the ports extending radially inwardly from an exterior surface of the annular manifold plate and intersecting an associated one of the manifold slots.

8. The method of claim 1, wherein interstitial spaces are formed between segments of the wire in each of the winding slots, and wherein the filler at least substantially fully fills the interstitial spaces.

9. The method of claim 1, wherein the filler is a two-part resin.

10. The method of claim 1, wherein the wire that forms each of the windings is shaped as a ribbon.

11. The method of claim 1, wherein the wire that forms each of the windings has a circular cross-section.

12. An electric motor comprising:
    a stator having a stator core with an interior circumferential surface, the stator core defining a plurality of winding slots, each of the winding slots extending longitudinally through the stator core as well as radially so as to intersect the interior surface, the winding slots being spaced circumferentially apart from one another so as to form a plurality of teeth, each of the teeth being disposed between an adjacent pair of the winding slots;

a plurality of windings, each of the windings being formed of wire, each of the windings being received in a predetermined set of the winding slots;

a plurality of plugs mounted to the stator core, each of the plugs being received between an associated adjacent pair of the teeth and closing a radially inward end of an associated one of the winding slots; and a filler compound received in each of the winding slots, the filler compound being more thermally conductive than air over a predefined temperature range.

13. The electric motor of claim 12, wherein each of the plugs is press-fit to the associated adjacent pair of the teeth.

14. The electric motor of claim 12, each of plugs abuts and seals against the associated adjacent pair of teeth.

15. The electric motor of claim 12, wherein the stator core comprises a pair of core segments and an annular manifold plate that is disposed between the core segments, each of the core segments defining a portion of each of the winding slots, wherein the annular manifold plate defines a plurality of circumferentially spaced apart manifold slots, each of the manifold slots forms a portion of a corresponding one of the winding slots, and wherein the filler compound extends radially through the annular manifold plate.

16. The electric motor of claim 15, wherein the annular manifold plate defines a plurality of circumferentially spaced apart ports, each of the ports extending radially outwardly from an interior surface of the annular manifold plate and intersecting an associated one of the manifold slots.

17. The electric motor of claim 15, wherein the annular manifold plate defines a plurality of circumferentially spaced apart ports, each of the ports extending radially inwardly from an exterior surface of the annular manifold plate and intersecting an associated one of the manifold slots.

18. The electric motor of claim 12, wherein interstitial spaces are formed between segments of the wire in each of the winding slots, and wherein the filler compound at least substantially fully fills the interstitial spaces.

19. The electric motor of claim 12, wherein the filler compound is a two-part resin.

20. The electric motor of claim 12, wherein the wire that forms each of the windings is shaped as a ribbon.

21. The electric motor of claim 12, wherein the wire that forms each of the windings has a circular cross-section.

* * * * *